March 24, 1959 J. F. ROSS ET AL 2,878,891
LOOP SEPARATOR FOR GASES AND SOLIDS
Filed Oct. 5, 1953

James F. Ross
Frank G. Turpin     Inventors
Joseph A. Polack
    By *Edwin M. Thomas* Attorney United States Patent Office 2,878,891
Patented Mar. 24, 1959

2,878,891

LOOP SEPARATOR FOR GASES AND SOLIDS

James F. Ross, Frank G. Turpin, and Joseph A. Polack, Baton Rouge, La., assignors to Esso Research and Engineering Company, a corporation of Delaware Application October 5, 1953, Serial No. 384,126

4 Claims. (Cl. 183—34)

The present invention relates to a loop separator for separation of gases and solids. More particularly, the invention relates to a high temperature, short contact time coking system for conversion of residual oils wherein products require quick separation after conversion. In some aspects, however, the invention is not limited to a coking or conversion system, as will appear hereinafter.

In the prior art, various suggestions have been made for converting petroleum residua and the like to olefins, aromatics of low boiling range, etc., by coking at very high temperatures. At least as early as the patent to Rittman, United States 1,412,123, attempts were made to manufacture benzene, toluene, etc. from heavy or residual oils. Subsequent suggestions were made for the production of acetylene, ethylene, propene, butenes, butadiene, etc., by high temperature coking. Some of these have proved to be feasible in a technical sense, but in general they have not been accomplished on a large scale because of various difficulties encountered.

More recently, it has been suggested that chemical raw materials such as listed above, i.e. the lower olefins, acetylene, diolefins and aromatics may be produced by contacting heavy petroleum oils and residues with hot particulate solids for a relatively very short contact time, often of the order of small fractions of a second. The solids selected for this purpose may be coke particles, e.g. of 40 to 400 microns or more average diameter, sand, beads, metal shot, etc., as is well known in the art. They are preferably non-catalytic, their function being first to carry and distribute heat to the oil to carry out the endothermic coking reaction and second to serve as a surface on which coke produced in the reaction can be deposited. Coke is usually the preferred heat carrier because it is produced in the process.

In operations of the type just described, it is important to supply adequate heat quickly to accomplish the desired conversion. It is equally important, once the conversion has been accomplished, to terminate the heating of the vaporous coking products as quickly as possible, preferably almost instantaneously. Quick cooling could of course be accomplished by drastic quenching, e.g. by drenching the total coker effluent, solids, liquid and vapor with water or other cooling agent, but this would be extremely wasteful of heat. The volume or mass of particulate solids is usually much larger, e.g. twenty-fold or more, than the oil feed. To quench and reheat this large volume of solids is usually prohibitive in cost.

Hence a major problem in coking to produce chemicals is to quench the vapors and gases of the coking products but not to quench the solids which are normally returned, largely or entirely, to the system for reheating and reuse. This requires a very rapid separation of solids from gas and vapor, so that the gas and vapor can be quenched independently. To accomplish this is a primary object of the invention.

In a copending application of Matheson, Serial No. 323,972, filed December 4, 1952, now abandoned, and in a copending application of Nicholson, Serial No. 370,281, filed July 27, 1953, now Patent No. 2,737,479, there are disclosed certain means which depend upon centrifugal force in a conduit for effecting substantial separation of gases and vapors from a stream of particulate solids entrained therein. The present invention is an improvement over the systems therein disclosed.

According to the present invention, a stream of gasiform products carrying entrained particulate solids is first passed through a curvilinear path of progressively diminishing radius of curvature to effect substantial separation of the solid particles by centrifugal force. It will be understood that the actual dimensions, e.g. the length of the radius of curvature at a given point, may vary more or less inversely with the stream velocity in the curvilinear path. Preferably the flow is in a curving conduit wherein the solid particles are concentrated by centrifugal force substantially against the outer periphery of the conduit's inner surface.

Since the products are most conveniently passed more or less vertically overhead the separating conduit is formed generally in a loop shape, the initial part thereof being supported in a more or less vertical plane. While the solid particles are quite readily thrown outwardly against the inner wall most remote from the center of curvature, they do not continue to follow this portion of the wall indefinitely. Gravity and a cohesive effect between adjacent particles tend to form particle streamlets which tend to flow back toward the lower inner surface of that part of the curvilinear conduit which is ahead, despite the fact that such lower part, at the moment, may be nearer the center of curvature. If a stream of gasiform product is drawn off toward the center of curvature at such a point, considerable entrainment of these streaming solids occurs. This tends largely to defeat the desired effect of the centrifuging in the earlier part of the conduit, despite a progressive decrease in instantaneous radius of curvature.

To offset this, according to the present invention, the curvilinear path is diverted from its more or less vertical initial plane and the draw-off for the gasiform material is arranged to project somewhat upwardly and not directly but only obliquely toward the center of curvature, i.e., directly opposite the accumulated solids. Primary gasiform products may thus be withdrawn comparatively free of entrained solid particles. The products so withdrawn may be quenched immediately upon withdrawal without quenching the solid stream. The latter is then passed through a secondary solids-gas separation zone, such as a conventional cyclone, and stripped to recover a secondary gas or vapor product. The quickly quenched primary gas or vapor product is relatively free of polymerization and other degradation products. The secondary product, because of its longer contact time with hot particulate solids, tends to be of lower quality but its quantity may be minimized and it may be used for other purposes than the primary product, if desired.

The above explanation has been related to a coking process to produce chemical raw materials from petroleum residua by contacting with hot particles. In such processes, as noted above, the particles are relatively inert and relatively non-catalytic. It will be understood, however, that the separating apparatus of the present invention may be utilized in other processes. For example, it may be employed for separating solid catalyst particles from reactants, or for removing particulate products from gasiform products in any system. It may be used, to some extent, to separate entrained liquid droplets from gasiform streams.

Other advantages and other objects of the invention will become more clearly apparent as the description of a specific embodiment is unfolded in detail. Therefore reference will next be made to the accompanying drawing wherein.

Figure 2:
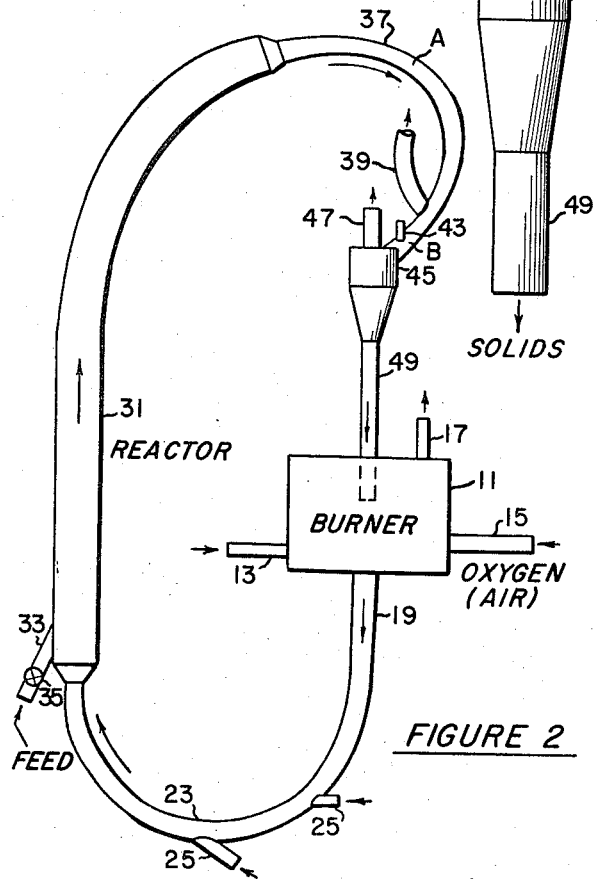
Fig. 2 is a vertical elevational view of a coking system embodying the invention, with parts broken away.

Referring first to Fig. 2 which shows a complete system, there is disclosed, by way of example, a system wherein a stream of solid particles, such as finely divided coke particles of about 40 to 400 microns average particle diameter, are preheated in a burner 11. This preheating may take place by simply feeding an oxygen-containing gas such as air into the burner after establishing a sufficiently high temperature to initiate combustion. The burner may be of any well known type such as a fluid bed burner or heater, a transfer line heater, or the like. Combustion may also be supported by introducing extraneous fuel such as oil or gas through a line 13, the air or oxygen being fed through a line 15. It will be understood that these parts are shown diagrammatically.

The combustion gases may be taken off through a suitable flue or outlet 17 as will be obvious to those skilled in the art. Combustion should be sufficient to raise the temperature of the solid particles to the desired level, usually at least 1200° F. for the production of chemical raw materials such as ethylene, acetylene, butadiene, and the aromatic materials mentioned above, etc. A preferred temperature for the particles leaving the burner is between 1250° and 1500° F., although even higher temperatures may be employed in some cases.

The solid particles, when sufficiently heated, are withdrawn through a conduit 19 controlled by any appropriate flow control means, not shown. From here they may be led through a U-bend or other connection 23 to the reactor. A propelling gas or aerating fluid such as steam may be introduced if desired through one or more inlets 25. It will be understood that the flow of particles from the burner to the reaction zone may be accomplished by establishing a fluistatic head as is well known in the art or by propelling them in disperse phase with a suitable propellent gas such as steam or the like.

The reactor 31 is shown in the form of an elongated tubular vessel but it may assume other forms if desired. It may, for example, be a fluid bed reactor of known type instead of the transfer line reactor shown. The terminal portion of the reactor 31 is curved in this embodiment though this is not important in some installations. The oil, for example a heavy residuum from a suitable crude, is introduced through a feed line 33 under control of a valve 35 and may be sprayed or otherwise injected in such a manner as to obtain good dispersion and uniform coating of the hot solid particles with the feed. The oil is preferably preheated to a suitable temperature, below cracking temperature, such as 300° to 700° F.

The contact time within the reactor should be so controlled that the total contact time, up to the point where the gasiform coking products and the solid particles are separated, is equal to the optimum coking time for the products in question. With solid particles heated to very high temperatures this may be the time of only a small fraction of a second. For some purposes and with solid particles less highly heated the time may be several seconds and up to as much as one minute. Generally, however, contact time is shorter and rapid vaporization and cracking of the feed takes place with the production of the desired olefins and/or aromatic materials.

Figure 1:
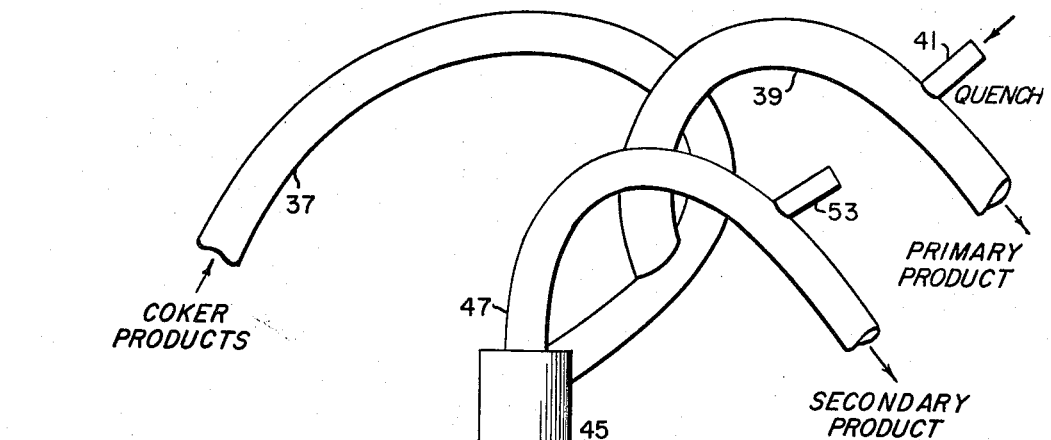
Fig. 1 is a vertical elevational view of a loop type separator for gases and solids embodying certain aspects of the invention, certain parts being omitted and other parts being broken away.
Figure 3:
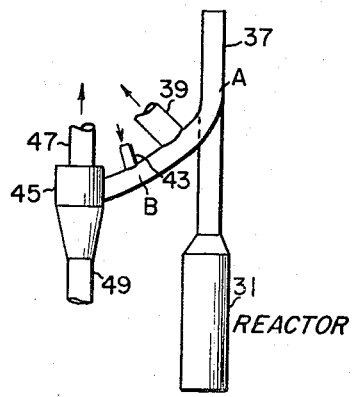
Fig. 3 is a fragmentary vertical elevational view, with parts broken away, of the loop separator means of Fig. 2, this figure being taken from the right side of Fig. 2 and approximately at right angles thereto.

Hence, when the gasiform products with entrained solid particles leave the reactor, the process of separation is commenced and must be carried through very quickly. For this purpose the products are passed at relatively high velocity from the reactor into a curvilinear gas-solids separator in the form of a tubular conduit 37. This conduit, as shown in larger scale at Fig. 1, is generally in the form of a loop which extends initially in more or less a vertical plane and preferably has a progressively decreasing radius of curvature in said plane. See also Fig. 3. The high velocity of the gas stream with its entrained solid particles causes the particles to be thrown by centrifugal force to the outer periphery of the conduit. Since the force of gravity keeps operating on these particles and there are certain cohesive forces between them they tend to gravitate toward the lowest side of the conduit. Thus despite a very substantial centrifugal force, by the time the products reach approximately point A in conduit 37 it is found that they begin to stream downwardly and somewhat toward the radially inside part of the conduit. Obviously if it were attempted to withdraw a stream of gasiform products at this point, toward the instantaneous center of curvature, there would be considerable entrainment of solids. Since this is highly undesirable the conduit 37 is deflected out of its generally vertical plane before the point of product withdrawal, e.g. at or near the point A, with a substantial horizontal component which is gradually increased as shown in Fig. 3. Thus, at point B the conduit 37 is considerably out of the vertical plane. However, the conduit is still at a considerably inclined angle, 30° to 60°, and should not approach a horizontal or level run. By this time the solid particles have pretty well concentrated toward the bottom part of the conduit and obliquely away from the center of curvature effective at the instant.

Accordingly, a withdrawal line 39 is provided opposite this point. This line extends obliquely toward but above the instantaneous center of curvature, the conduit being inclined generally upwardly as indicated in the drawing. It has been found by careful experiment that this arrangement substantially reduces solids entrained in the gasiform stream which is withdrawn. The withdrawal port should be at least as large, and preferably a little larger than the cross-section of conduit 37.

Means are provided for quickly quenching the stream of primary products as indicated at 41, Fig. 1. The quenching means may be any suitable coolant, such as a spray of water, hydrocarbons, or other cooling liquid. Previously recovered products, cooled to a liquid, may be used to quench. The primary products thus withdrawn and quenched are found to be of high quality. By proper timing of the operation for the temperature of reaction involved, that is by adjusting the gas or vapor velocity in the conduit 37 and in conduit 39, a high quality of primary product may be maintained.

While stripping of the solids separated from the primary product is not always necessary, it is usually desirable. For this purpose a stripping fluid may be introduced through an inlet 43 into the conduit 37 as shown in Figures 2 and 3. This inlet is not visible in Fig. 1. From this point the residual vapor and/or liquid products, including the solids and the stripping fluid, where the latter is used, pass into a conventional cyclone 45 having an upwardly extending outlet 47 for the vapor products and a downwardly extending outlet 49 for the solids and any condensed liquid particles. In the case of a coking operation the solids (and liquid) may be returned to the burner for recycling as shown in Fig. 2. It will be understood that all or substantially all of the vapors may be withdrawn as primary products, the solids continuing on their way to the cyclone simply by gravity.

The secondary products withdrawn through line 47 may also require quenching and this is generally the case. For this purpose a line 53 is provided for introducing a quenching fluid such as water, liquid hydrocarbon or the like into the secondary withdrawal line 47, Fig. 1.

While the above description is exemplary of a coking operation it is believed that it will be clear that other types of solids and gases may be separated with or without quenching in the same general manner.

The following data taken from carefully controlled experiments are indicative of the efficiency of the apparatus and process of this invention as compared with some of the prior efforts to achieve solids separation in a similar situation.

The system described above has been found to give a separation efficiency of 99.8% of the solids, with a gas velocity of 25 ft. per second in conduit 37, as compared with about 80 to 90% efficiency in a simple plane overhead loop with the primary product withdrawn in the plane of the loop and only 60% with a loop which rises in a vertical plane and descends on about a 45° plane with the solids withdrawn toward the center of curvature.

Preferably, the loop separator should have approximately the following design features:

(1) The loop separator (which may include a terminal part of the reactor) should curve for about 180—240° upstream from the gaseous product drawoff, so that both gravity and centrifugal force will tend to keep all the solids on the outside wall of the loop.

(2) The drawoff line should be directed somewhat upwardly from the horizontal and have a cross-sectional area at least as large as, and preferably larger than, the cross-sectional area of the loop separator itself. This will permit the gases to leave the separator at a velocity low enough to preclude excessive entrainment of the solid particles. The drawoff line must be opposite that part of the wall where most of the solids tend to flow and should preferably be directed at an angle approximately perpendicular to the loop at its base.

(3) In that portion of the loop where flow is in a downward direction, the loop separator should be helically, or doubly, curved. That is to say, there must be at least two separate radii of curvature, these radii preferably lying more or less at right angles to each other. This is necessary to combine the force of gravity and the centrifugal force exerted on the solids into a resultant force tending to pull the solids as far as possible away from the product drawoff. This double curvature is most important, because most of the entrainment observed in a planar loop appears to have resulted from failure to utilize the force of gravity, as well as centrifugal force, to disengage the solids from the gas.

(4) Below the point of primary drawoff, there must be no horizontal section of the separating loop. After removing gas from the solids the slope of the line must be greater than the angle of solids repose to permit uninterrupted solids flow out of the separator. This angle is preferably between 30° and 60°, an angle of 45° being very suitable in most cases. An exception to this may be made when all of the gas is not withdrawn through the loop drawoff and enough gas remains to carry the solids from the separator. In the apparatus of this invention it is not necessary to leave impelling gas in the separator after the product withdrawal, since the solids will continue to flow by gravity.

(5) The radii of curvature of the separator should be kept as small as practicable in order to increase centrifugal force on the solids and thereby enhance separation. This force can be maximized for a given overall sized loop, by having progressive radii of curvature gradually or continuously decreasing and progressively changing their directions so as to be smallest immediately above and opposite the drawoff. Thus an envelope of these radii would be a twisted surface and not a plane.

In contrast, the use of a conventional cyclone separator for separation of the primary product has the following disadvantages:

(1) Reaction holding time cannot be controlled accurately. In effect the volume of the cyclone has to be included in the volume of the reactor. Total holding time cannot be lower than holding time in the cyclone, which is relatively large when the total must be so short. For example, in a proposed commercial design of a high temperature coking process, cyclone holding time would be 50% of the total reaction time (of the order of 0.5 sec.).

(2) Holding time for products in the cyclone is not uniform. Some vapors are not removed from the solids in passing through the cyclone. These gases are subsequently stripped in the cyclone dipleg after relatively long contact times, but they are mixed with the products withdrawn earlier.

(3) Cyclone erosion in a cyclone adequate for full separation of products is often a serious problem at the high velocities encountered with the short contact times.

The following advantages are inherent in this apparatus and process:

(1) Holding time may be as short or as long as necessary. It may be varied by simply changing the point of feed injection and/or by changing the velocity through the separator.

(2) Holding time will always be uniform at a uniform velocity.

(3) Velocity into a cyclone following the loop separator may easily be reduced below erosion velocities without degrading the products.

(4) The efficiency of separation of the solids from the gas will not be affected by solids concentration in the gas to the extent encountered in a cyclone separator.

(5) The loop separator is efficient over a greater range of velocities than the conventional cyclone separator. Pressure drop also is considerably less at the higher velocities in a loop separator than in a cyclone of conventional type.

What is claimed is:

1. Apparatus for separating entrained solid particles from a gasiform stream carrying them, which comprises, a primary gas-solids separator in the form of a curved conduit, said conduit extending first upwardly and then downwardly in the form of an overhead loop of progressively decreasing radii of curvature, the initial section of said downwardly directed conduit portion lying in a generally vertical plane, the last portion of said curved conduit being deflected out of said generally vertical plane by having a substantial horizontal component of direction so as to compensate for the gravitational flow pattern of the solid particles, gas-withdrawal conduit means extending upwardly from the last portion of said curved conduit for removal of primary product gases therefrom, said conduit means extending obliquely towards the instantaneous center of curvature of the section of the horizontally deflected curved conduit portion to which it is fixed so as to reduce solids entrainment in withdrawn gases, and a secondary gas-solids separator at the terminus of said above described curved primary separator for receiving the solids stream therefrom and for further separating a secondary gasiform product from said solids.

2. Apparatus according to claim 1 including means for injecting a stripping gas into the primary separator after the point of withdrawal of the primary product.

3. A gas-solids separator of the character described comprising a curvilinear conduit passing through 180° to 240° of arc, with a progressively decreasing radius of curvature, an initial part of said conduit being relatively vertical and a subsequent part inclined more toward the horizontal but continuing to have a slope greater than the angle of repose for dry particulate solids such as coke particles such as produced by coking heavy oil in a fluid solids system and the like, and laterally and upwardly extending conduit means for withdrawing primary product gases without substantial entrainment, from said inclined portion.

4. Apparatus according to claim 3 wherein means are provided for injecting a stripping gas into said conduit after the point of primary product withdrawal.

References Cited in the file of this patent

UNITED STATES PATENTS

| | | |
|---|---|---|
| 532,144 | Day | Jan. 8, 1895 |
| 789,049 | Middleton | May 2, 1905 |
| 2,059,814 | Schneider et al. | Nov. 3, 1936 |
| 2,362,270 | Hemminger | Nov. 7, 1944 |
| 2,485,315 | Rex et al. | Oct. 18, 1949 |
| 2,489,618 | Cantin | Nov. 29, 1949 |
| 2,602,019 | Odell | July 1, 1952 |
| 2,623,010 | Schutte | Dec. 23, 1952 |
| 2,737,479 | Nicholson | Mar. 6, 1956 |

FOREIGN PATENTS

| | | |
|---|---|---|
| 32,749 | Germany | Aug. 31, 1885 |
| 849,649 | Germany | Sept. 18, 1952 |